United States Patent
Nakamura (10) Patent No.: US 8,904,374 B2
(45) Date of Patent: Dec. 2, 2014

(54) FIRMWARE UPDATE DATA GENERATING APPARATUS AND INFORMATION DEVICE

(75) Inventor: Yuichi Nakamura, Tokyo (JP)

(73) Assignee: Hitachi Soloutions, Ltd., Tokyo (JP)

( * ) Notice: Subject to any disclaimer, the term of this patent is extended or adjusted under 35 U.S.C. 154(b) by 925 days.

(21) Appl. No.: 13/120,178

(22) PCT Filed: Aug. 18, 2010

(86) PCT No.: PCT/JP2010/063933
§ 371 (c)(1),
(2), (4) Date: Mar. 22, 2011

(87) PCT Pub. No.: WO2011/021643
PCT Pub. Date: Feb. 24, 2011

(65) Prior Publication Data
US 2011/0179408 A1    Jul. 21, 2011

(30) Foreign Application Priority Data
Aug. 21, 2009    (JP) .................................. 2009-192413

(51) Int. Cl.
*G06F 9/44*    (2006.01)
*G06F 9/445*    (2006.01)

(52) U.S. Cl.
CPC ........................................ *G06F 8/66* (2013.01)
USPC ............ 717/170; 717/168; 717/169; 717/171

(58) Field of Classification Search
None
See application file for complete search history.

(56) References Cited

U.S. PATENT DOCUMENTS

| | | | |
|---|---|---|---|
| 6,938,109 B1* | 8/2005 | Sliger et al. .................... | 710/68 |
| 7,509,636 B2* | 3/2009 | McGuire et al. ............. | 717/168 |
| 7,665,081 B1* | 2/2010 | Pavlyushchik ................ | 717/168 |
| 7,676,506 B2* | 3/2010 | Reinsch ........................ | 717/169 |
| 2003/0182414 A1* | 9/2003 | O'Neill ......................... | 709/223 |
| 2003/0220944 A1* | 11/2003 | Lyman Schottland et al. ............................ | 707/203 |
| 2004/0088694 A1* | 5/2004 | Ho ................................. | 717/170 |
| 2004/0260734 A1 | 12/2004 | Ren et al. | |
| 2005/0022175 A1* | 1/2005 | Sliger et al. .................. | 717/169 |

(Continued)

FOREIGN PATENT DOCUMENTS

| | | |
|---|---|---|
| CN | 1809818 A | 7/2006 |
| CN | 101006429 A | 7/2007 |

(Continued)

OTHER PUBLICATIONS xdelta: http://xdelta.org/, Release 3.0.0, Jan. 8, 2011.

*Primary Examiner* — Insun Kang
(74) *Attorney, Agent, or Firm* — Mattingly & Malur, PC (57) ABSTRACT

There is provided a firmware updating technique for which consumed memory and writing time are small for devices subject to a firmware update, for which the distributed update size is small, and which is performed via a broadcast network. To this end, assuming that the latest firmware version is N, there is provided a means that extracts differences between firmware of version j−i and firmware of version i (j−1→j differences) for j=2 to N, and that distributes these differences together via the broadcast network. With respect to a device subject to an update comprising firmware of version i, there is provided a means that saves, of the distributed j−1→j differences (where 2≤j≤N), only the differences for which j<i in a storage area, generates an i→N difference based on the saved j−1→j differences (where i≤j≤N), and updates the firmware in flash memory based on the content of the i→N difference (see FIG. 1).

3 Claims, 10 Drawing Sheets

(56) References Cited

U.S. PATENT DOCUMENTS

| | | |
|---|---|---|
| 2005/0257208 A1* | 11/2005 | Blumfield et al. ............ 717/168 |
| 2006/0048130 A1* | 3/2006 | Napier et al. ................. 717/168 |
| 2006/0130046 A1* | 6/2006 | O'Neill ......................... 717/168 |
| 2006/0161605 A1 | 7/2006 | Terazono et al. |
| 2006/0174238 A1* | 8/2006 | Henseler et al. ............. 717/168 |
| 2007/0208786 A1* | 9/2007 | Kim .............................. 707/203 |
| 2007/0263716 A1 | 11/2007 | Huang et al. |
| 2007/0294684 A1* | 12/2007 | Kumashiro et al. .......... 717/168 |
| 2007/0294685 A1 | 12/2007 | Oh |
| 2007/0294686 A1 | 12/2007 | Oh |
| 2008/0098160 A1* | 4/2008 | Slyz et al. .................... 711/103 |
| 2009/0070754 A1 | 3/2009 | Ichikawa |
| 2010/0293538 A1* | 11/2010 | Wolf et al. .................... 717/170 |
| 2010/0325622 A1* | 12/2010 | Morton ......................... 717/168 |
| 2011/0173604 A1* | 7/2011 | Nakamura et al. ........... 717/173 |

FOREIGN PATENT DOCUMENTS

| | | |
|---|---|---|
| CN | 101031038 | 9/2007 |
| CN | 101055526 A | 10/2007 |
| CN | 101356519 A | 1/2009 |
| JP | 4-30218 A | 2/1992 |
| JP | 11-110218 A | 4/1999 |
| JP | 2001-325140 A | 11/2001 |
| WO | 2005/055055 A1 | 6/2005 |
| WO | 2006/046506 A1 | 5/2006 |

* cited by examiner

| Update procedure | Data |
|---|---|
| 431 — copy /foo/bar | <Data for use in update procedure> |
| 432 — remove /foo/bar2 | None |

| Difference version number | Upate data |
|---|---|
| 531 — 1→2 | Update data for firmware image of version number 2 and firmware image of version number 1 |
| 532 — 2→3 | Update data for firmware image of version number 3 and firmware image of version number 2 |
| 533 — 3→4 | Update data for firmware image of version number 4 and firmware image of version number 3 |
| 534 — 4→5 | Update data for firmware image of version number 5 and firmware image of version number 4 |

Fig. 6

| Difference version number | Upate data |
|---|---|
| 1→2 | Update data for firmware image of version number 2 and firmware image of version number 1 |
| 2→3 | Update data for firmware image of version number 3 and firmware image of version number 2 |
| 3→4 | Update data for firmware image of version number 4 and firmware image of version number 3 |
| 4→5 | Update data for firmware image of version number 5 and firmware image of version number 4 |

140

610 — Difference version number
620 — Upate data
631, 632, 633, 634

Fig. 7

340
710 — version number
721 — 2

Fig. 8

810
Data for 2→3

| Update procedure | Data |
|---|---|
| 811 — copy /foo/bar | <Data for use in update procedure> |
| 812 — remove /foo/bar2 | None |

820
Data for 3→4

| Update procedure | Data |
|---|---|
| 821 — copy /foo/bar3 | <Data for use in update procedure> |

830
Data for 4→5

| Update procedure | Data |
|---|---|
| 831 — copy /foo/bar | <Data for use in update procedure> |

840
Data for 2→5

| Update procedure | Data |
|---|---|
| 841 — copy /foo/bar | <Data for use in update procedure> |
| 842 — remove /foo/bar2 | None |
| 843 — copy /foo/bar3 | <Data for use in update procedure> |

FIRMWARE UPDATE DATA GENERATING APPARATUS AND INFORMATION DEVICE

TECHNICAL FIELD

The present invention relates to an update data generating apparatus and information device as well as program and, more particularly, to updating firmware with respect to information devices.

BACKGROUND ART

When a bug is found in firmware after embedded devices have been released, it is common practice to solve the problem by overwriting the old firmware with firmware in which the bug has been fixed. The term firmware as used herein refers to all the data that is pre-stored in a non-volatile storage area of an embedded device. As documents relating to such firmware updates, there are, for example, Patent Document 1 and Non-Patent Document 1.

Patent Document 1 is a firmware updating method in which firmware is replaced entirely. Since firmware is replaced entirely, if an update were to be performed via a network, all firmware images of the new version would have to be distributed, and the size of the data to be distributed would thus become large.

Further, Non-Patent Document 1 is a technique for extracting the difference between an old version of data and a new version of data. In updating firmware via a network, it is possible to reduce the size of distributed data by distributing only the updated difference in firmware using this technique.

PRIOR ART DOCUMENTS

Patent Document

Patent Document 1: JP Patent Publication (Kokai) No. 11-110218 A (1999)
Non-Patent Document
Non-Patent Document 1: xdelta: http://xdelta.org/

SUMMARY OF THE INVENTION

Technical Problem

However, with the method of Patent Document 1, the size of the data to be distributed becomes too large. Thus, for example, in executing a firmware update via a broadcast network such as broadcast waves, since such a network is low in transmission speed and high in per-bit cost, the method of Patent Document 1 is undesirable. The update size for firmware needs to be made smaller.

On the other hand, with the method of Non-Patent Document 1, it is possible to reduce data size since only the update difference of the firmware is distributed. However, there is a problem in that, as the number of versions of the firmware increases, data size becomes greater. For example, if the latest version of the firmware is 5, the versions of the firmware of devices subject to distribution would range from versions 1 to 5. Thus, four kinds of data, namely the differences between versions 1 and 5, 2 and 5, 3 and 5, and 4 and 5, would have to be distributed. Further, on the embedded device's end, NOR-type flash memory with limited physical memory and low writing speed is often used. Thus, there is a problem in that, in order to apply the difference data for update that has been distributed according to Non-Patent Document 1, the used area of memory becomes large and it takes a long time to write the difference data for update.

The present invention has been made in view of such circumstances, and provides a firmware updating technique where the used memory volume on the embedded device's end is reduced, the writing time shortened and, further, the size of the distributed data for update reduced.

Solution to Problem

In order to solve the problems above, in the present invention, an update data creating apparatus takes as input a firmware image of a new version (version N) for a device subject to an update (information device) and a firmware image that is one version older (version N−1), and extracts the difference between the firmware image of version N and the firmware image of version N−1 (which is denoted the N−1→N difference), which is accumulated in device A. Device A puts together the accumulated 1→2 difference, 2→3 difference, 3→4 difference . . . , and (N−1)→N difference as an update file, and distributes the update file to a broadcast network.

On the other hand, if firmware of version i (where $1 \leq i \leq N$) is written in flash memory in the device subject to an update and that firmware is running, the device subject to an update receives the update file over the broadcast network. Although the update file includes (j−1)→j differences (where $2 \leq j \leq N$), the device subject to an update does not keep in its storage area the differences for which $j \leq i$ holds true, and discards them, only keeping the differences for which $i < j$ holds true in its storage area. From the received (j−1)→j differences (where $i < j \leq N$), the device subject to an update generates an i→N difference, and applies the i→N difference to the firmware image, thus updating it to the firmware image of version N.

Specifically, an update data generating apparatus according to the present invention comprises: a difference file group storage part that stores a plurality of difference files, the plurality of difference files being, with respect to firmware images of a plurality of versions, differences between the firmware images of mutually adjacent versions; an update file generation part that generates a plurality of difference files, which are at least a portion of all of the difference files stored in the difference file group storage part, as an update file; and an update file transmission part that transmits to an information device (a device subject to a firmware update) via a network (for example, a network that enables point-to-multipoint, such as a broadcast network, etc.) the generated update file.

In addition, the difference files each comprise: a difference version number indicating that it is the difference between firmware images of version j (where j=1 . . . , n−1; and n is an integer satisfying n>j) and version j+1; and update data comprising an update procedure indicating what sort of processing is to be executed with respect to which file of the firmware, and configuration data to be used in the update procedure.

An update data generating apparatus further comprises: a data acquisition part that acquires a firmware image of the latest version; an old-version firmware image storage part that stores at least an firmware image of an old version that is most recent relative to the firmware image of the latest version; and a difference file generation part that generates a latest difference file and adds the latest difference file to the difference file group storage part, the latest difference file being the difference between the firmware image of the latest version and the firmware image of the most recent old version.

On the other hand, an information device according to the present invention has firmware embedded and comprises: an update file reception processing part that receives an update file for updating the firmware, the update file being transmitted via a network; an update optimization processing part that generates, based on the update file, optimized update data that is best suited for updating a firmware image of a current version; and an update application processing part that updates the firmware image by applying the optimized update data to the firmware image of the current version. Here, the update file comprises a plurality of difference files that are, with respect to firmware images of a plurality of versions up to the latest version, differences between the firmware images of mutually adjacent versions. In addition, the difference files each comprise: a difference version number indicating that it is the difference between firmware images of version j (where j=1 . . . , n−1; and n is an integer satisfying n>j) and version j+1; and update data comprising an update procedure indicating what sort of processing is to be executed with respect to which file of the firmware, and configuration data to be used in the update procedure. Further, the update file reception processing part deletes from the received update file the difference files of version numbers up to the version number of the firmware image of the current version, and takes the remaining difference files to be an applicable file. In addition, the update optimization processing part generates, using the applicable file, optimized update data for directly updating from the firmware image of the current version to the firmware image of the latest version. More specifically, the update optimization processing part generates the optimized update data by removing redundant update procedures from the plurality of difference files included in the applicable file, thus leaving only the latest update procedure and configuration data.

Further features of the present invention should become apparent from the best modes for carrying out the present invention presented below as well as from the appended drawings.

Advantageous Effects of Invention

According to the present invention, the used memory volume on the embedded device's end can be reduced, while shortening writing time. In addition, it is possible to reduce the distributed update data size.

DESCRIPTION OF EMBODIMENTS

The present invention relates to a technique that enables efficiently (distribution costs can be reduced, and less memory capacity and update time are needed with respect to information devices) updating firmware with respect to information devices in which firmware is embedded.

Embodiments of the present invention are described below with reference to the appended drawings. However, it should be noted that the embodiments are merely examples for realizing the present invention, and that they do not by any means limit the technical scope of the present invention. Further, with respect to each of the drawings, common features are identified with like reference numerals.

<Configuration of Firmware Updating System>

Figure 1:
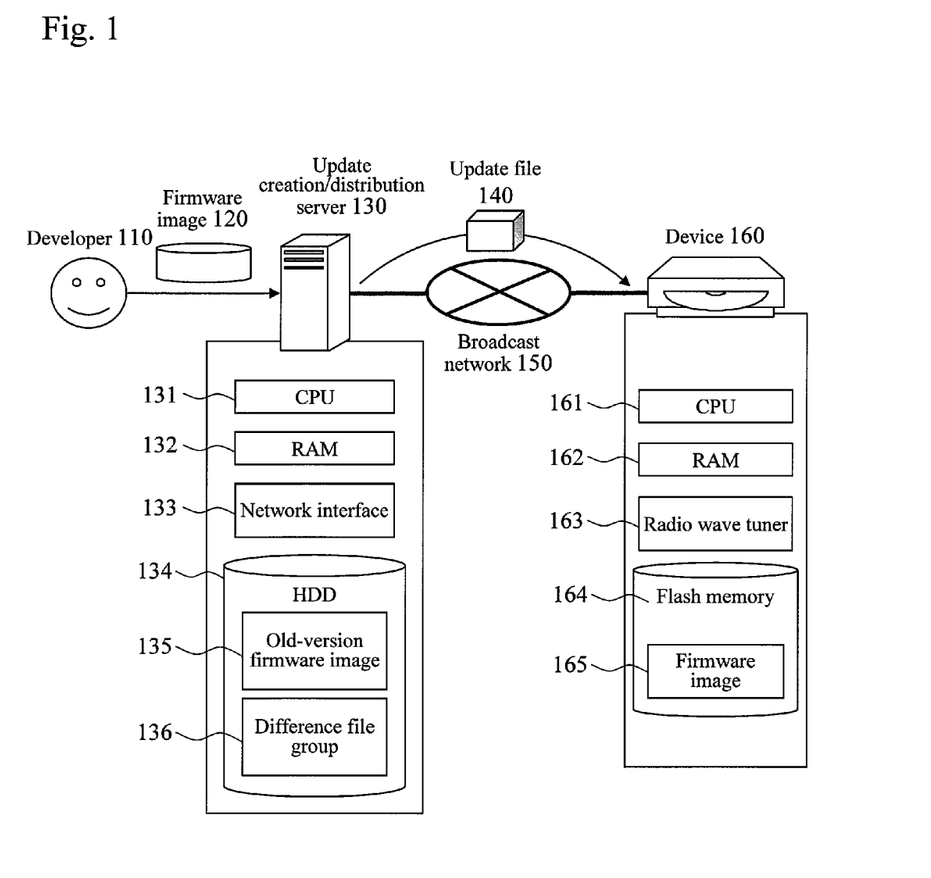
FIG. 1 is a diagram showing the general configuration of a firmware updating system according to an embodiment of the present invention.

FIG. 1 is a diagram showing a general configuration of a firmware updating system according to an embodiment of the present invention. The firmware updating system comprises: an update creation/distribution server 130; and at least one firmware embedded device 160 (hereinafter "device 160") such as, for example, a DVD recording/playing apparatus, etc. The update creation/distribution server 130 and the device 160 are coupled via a network such as, for example, a broadcast network 150.

Once a developer 110 creates new firmware, a firmware image 120 thereof is transferred to the update creation/distribution server 130. Here, the firmware image 120 is one in which software developed by the developer 110 and configuration files have been archived as one file.

The update creation/distribution server 130 comprises hardware as a computer having network functions, and, more specifically, comprises: a CPU 131; RAM 132; a network interface 133; and an HDD 134. The network interface 133 is provided with a LAN interface for enabling access from the developer 110, and an interface for the broadcast network 150 in order to distribute an update file 140 over the broadcast network 150.

Figure 5:
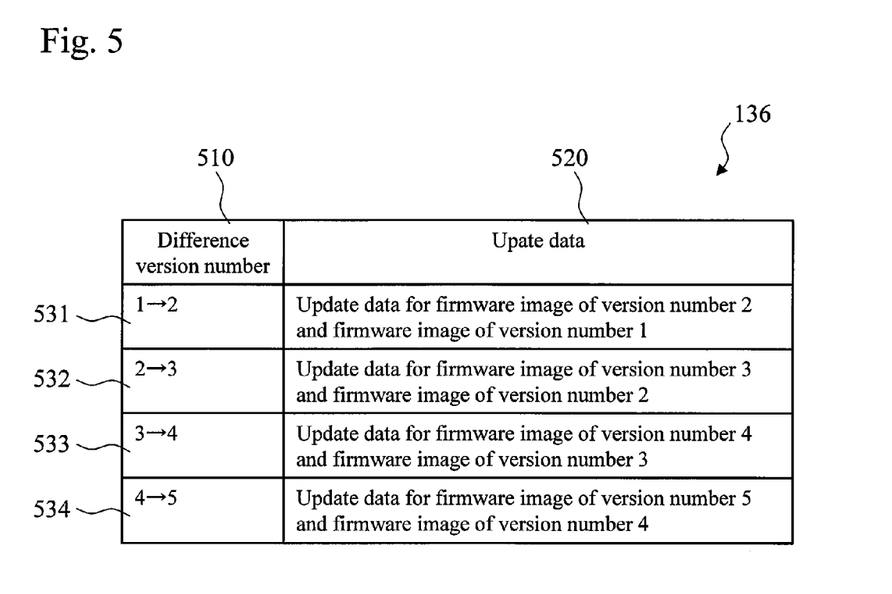
FIG. 5 is a diagram showing a configuration example of a difference file group.

The HDD 134 stores an old-version firmware image 135 and a difference file group 136. The old-version firmware image 135 may be a firmware image that is one version older than the firmware image 120, or all firmware images of old versions may be saved. The difference file group 136 is data that is used to create the update file 140, a detailed configuration of which is shown in FIG. 5.

Figure 2:
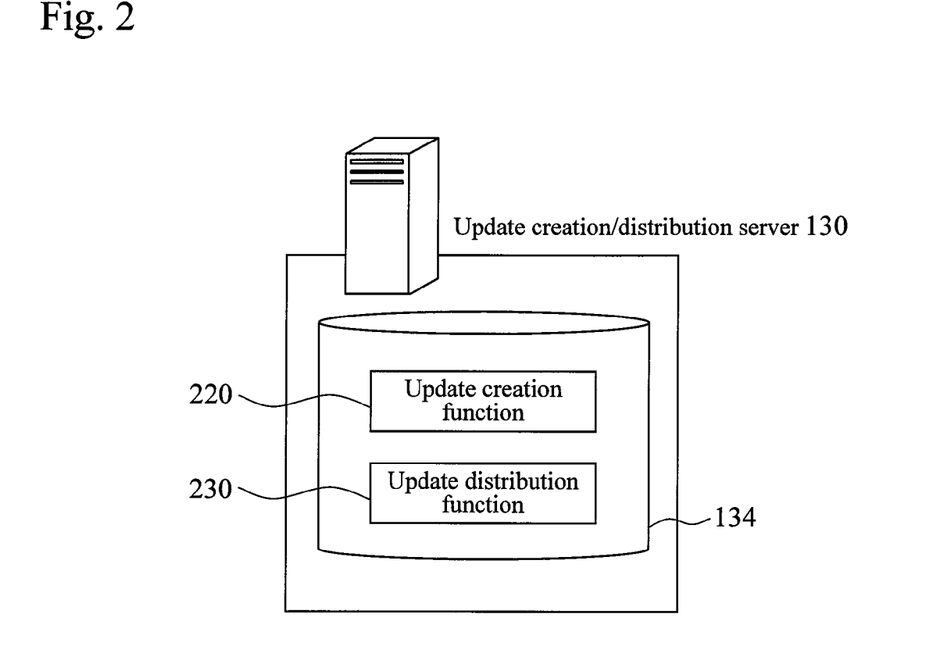
FIG. 2 is a diagram showing the software configuration of an update creation/distribution server.
Figure 6:
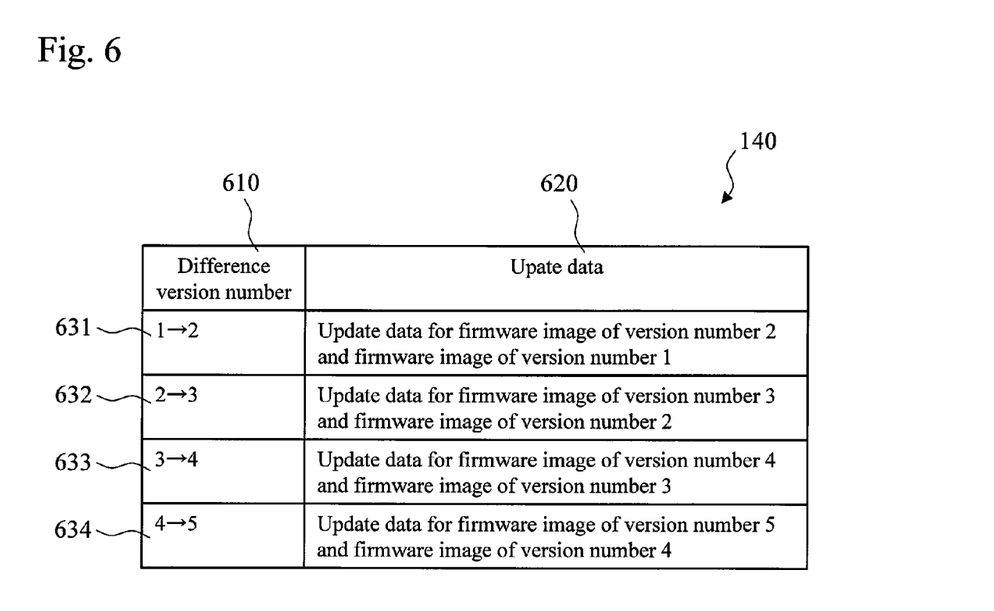
FIG. 6 is a diagram showing a configuration example of an update file.

The update creation/distribution server 130 distributes the update file 140, which is used for a firmware update of the device 160, via the broadcast network 150. A configuration of the update file 140 is shown in FIG. 6. A detailed software configuration of the update creation/distribution server 130 is shown in FIG. 2. The broadcast network 150 is a network, a representative example of which is a broadcast wave network, and the same data is transmitted to a plurality of receivers from a transmitter.

The device 160 comprises hardware as a computer having a function of receiving data from the broadcast network 150, and, more specifically, comprises: a CPU 161; RAM 162; a radio wave tuner 163; and flash memory 164.

Figure 3:
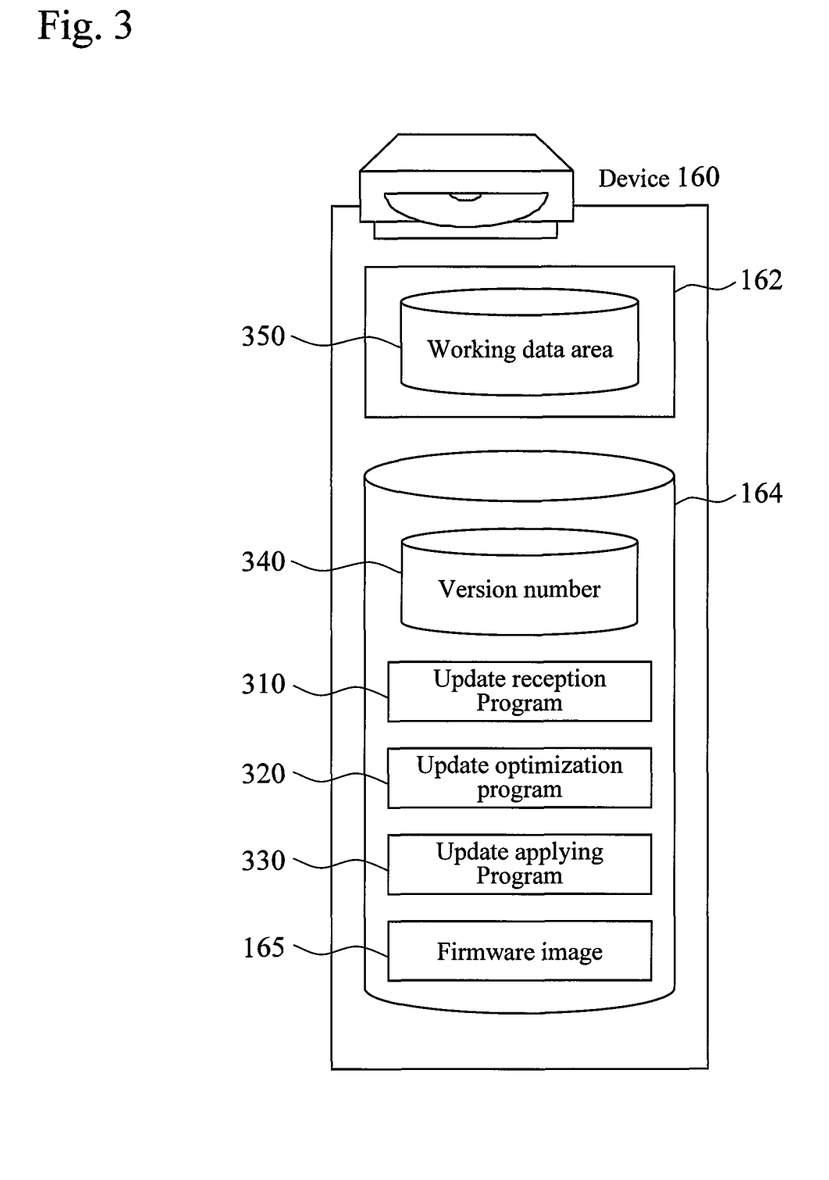
FIG. 3 is a diagram showing the software configuration of a firmware embedded device.

The device 160 receives the update file 140 that is transmitted to the broadcast network 150, and updates a firmware image 165 stored in the flash memory 164. A detailed software configuration of the device 160 is shown in FIG. 3.

It is noted that in the present embodiment, the update creation/distribution server 130 comprises both an update file creation function and an update file distribution function. However, the creation function and the distribution function may also be separated and configured as separate apparatuses.

<Software Configuration of Update Creation/Distribution Server 130>

Figure 9:
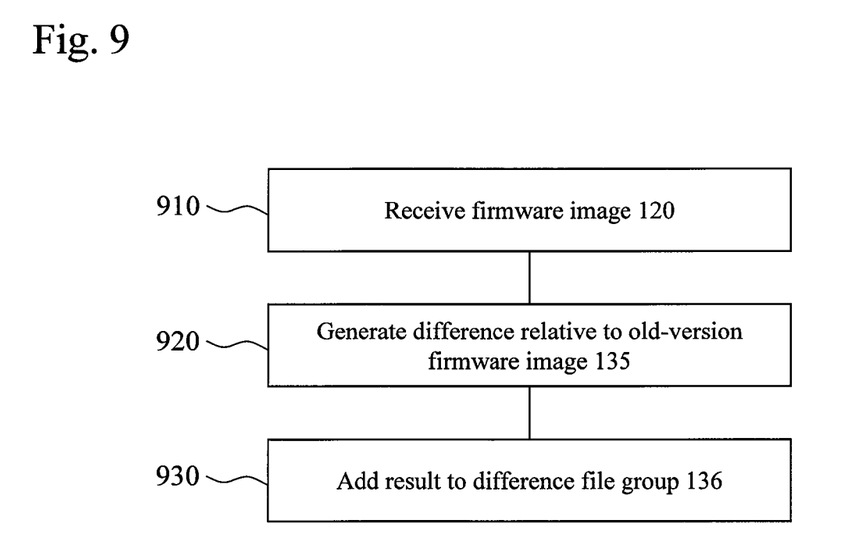
FIG. 9 is a flowchart illustrating a process of an update creation function.
Figure 10:
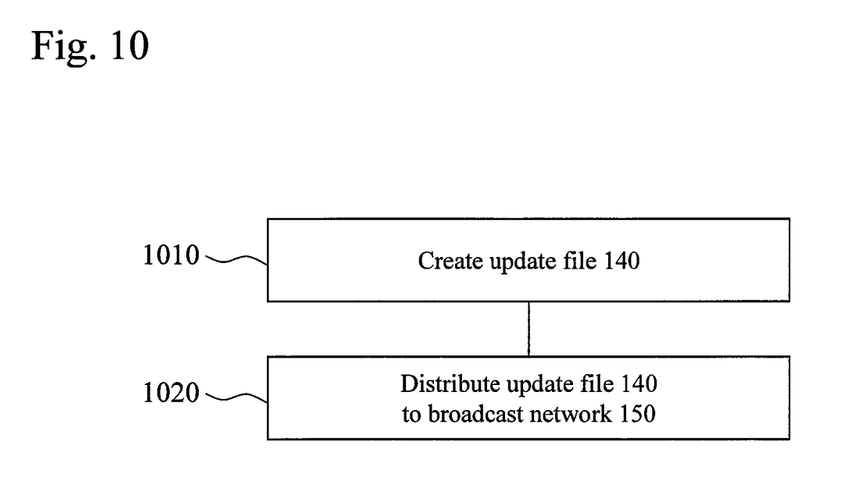
FIG. 10 is a flowchart illustrating a process of an update distribution function.

FIG. 2 is a diagram showing a software configuration of the update creation/distribution server 130. As shown in FIG. 2, the update creation/distribution server 130 comprises an update creation function (program) 220 and an update distribution function (program) 230. The update creation function 220 generates the difference file group 136 using the firmware image 120 and old-version firmware, and creates the update file 140 based thereon. A detailed process is shown in FIG. 9. On the other hand, the update distribution function 230 comprises a function of transmitting to the broadcast network 150 the update file 140 created by the update creation function 220. A detailed process is shown in FIG. 10.

<Software Configuration of Device 160>

FIG. 3 is a diagram showing a software configuration of the device 160. As shown in FIG. 3, the device 160 comprises: an update reception program 310; an update optimization program 320; an update applying program 330; and a version number storage part 340. Processes by these programs are executed using a working data area 350, which is part of the RAM 162.

Figure 11:
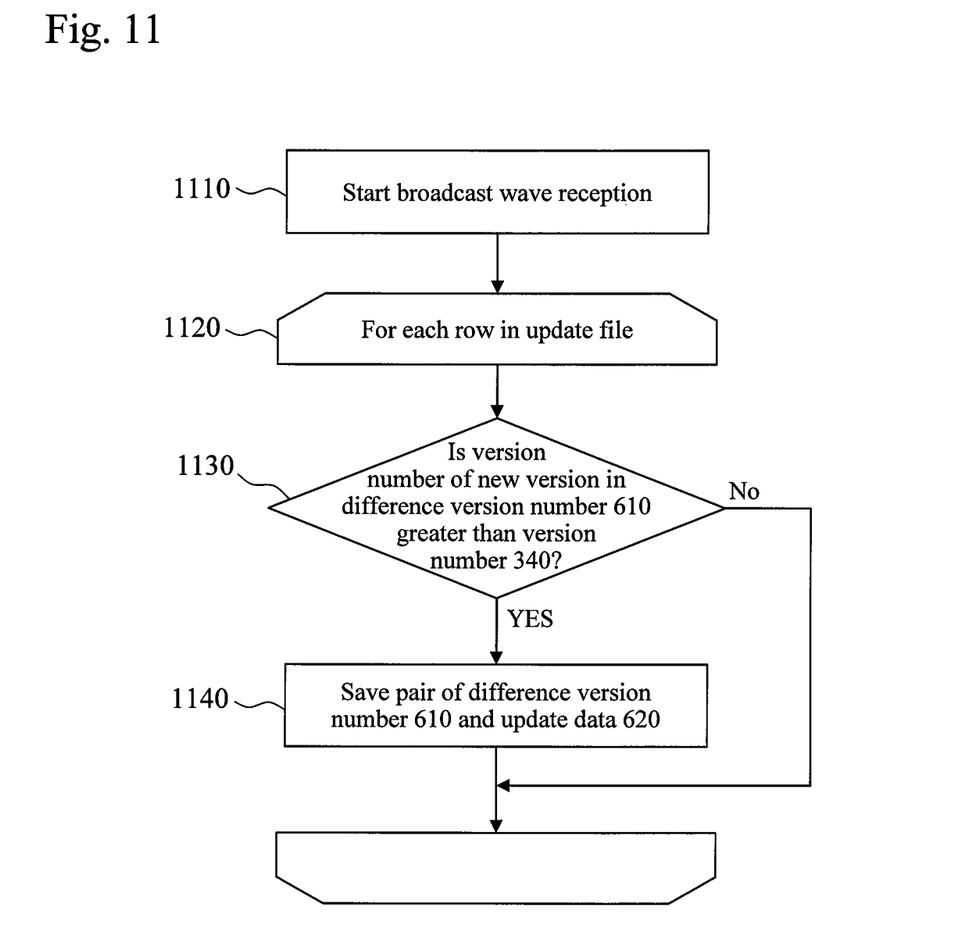
FIG. 11 is a flowchart illustrating a process by an update reception program.
Figure 12:
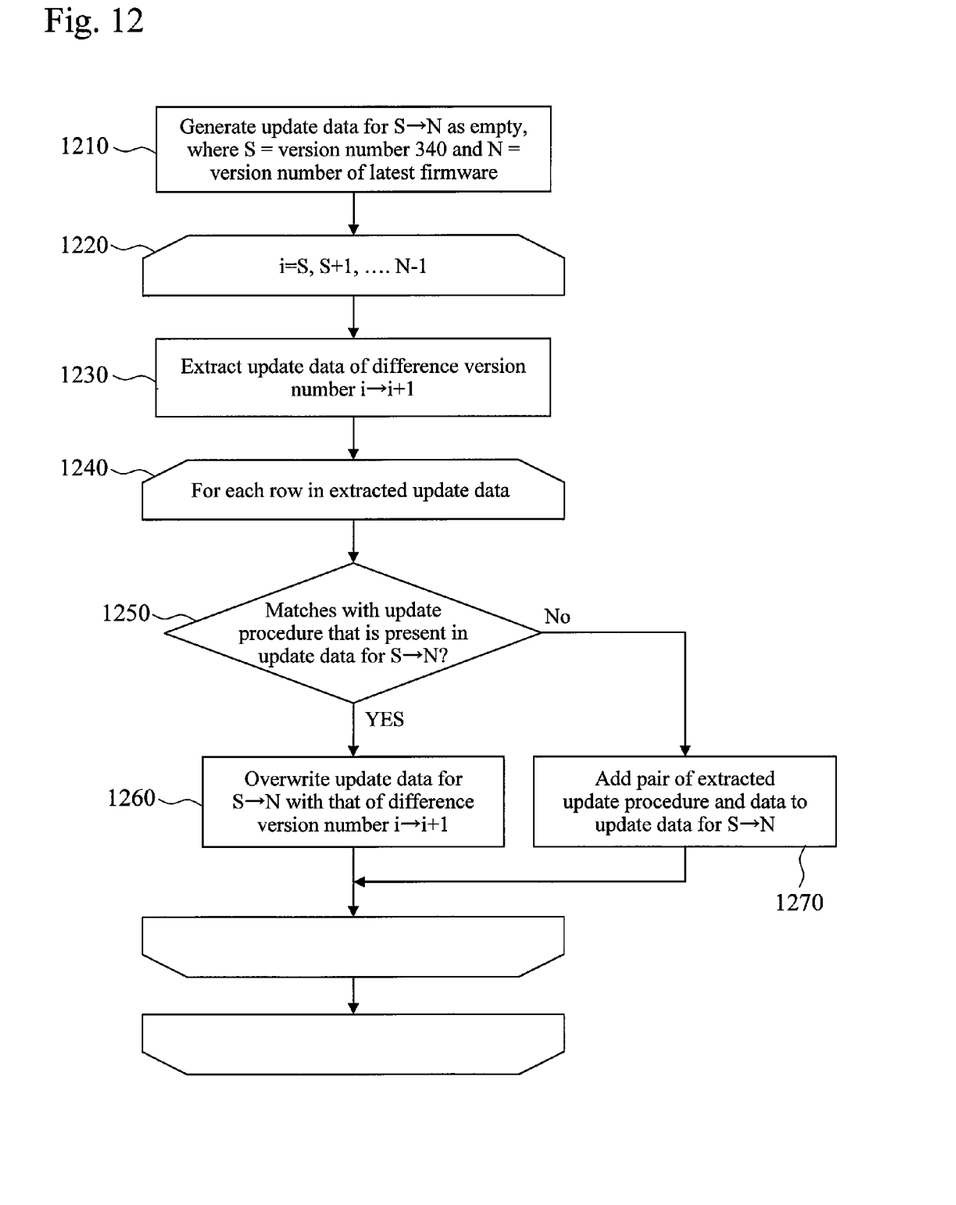
FIG. 12 is a flowchart illustrating a process by an update optimization program.
Figure 13:
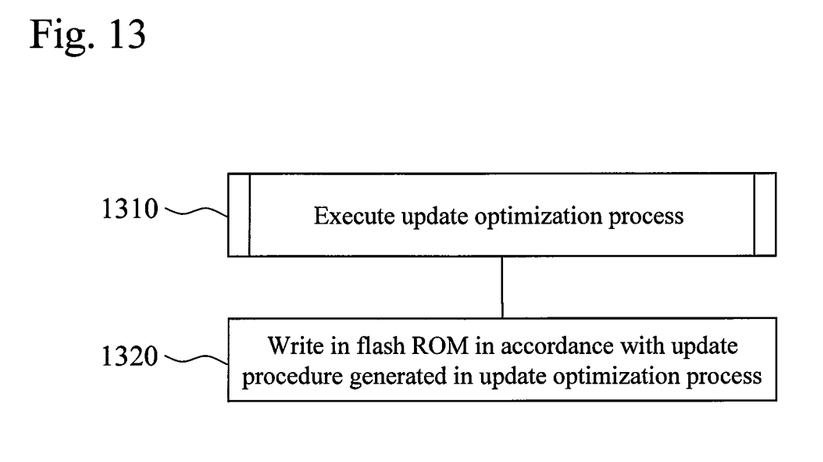
FIG. 13 is a flowchart illustrating a process by an update applying program.

The update reception program 310 is a program for receiving the update file 140 from the network, and details of the process are shown in FIG. 11. In addition, the update optimization program 320 is a program that optimizes the update file 140 received by the update reception program 310, and details of the process are shown in FIG. 12. Further, the update applying program 330 is a program that reflects in the firmware image 165 the optimized update data, which is the update content written in the update file 140, and details of the process are shown in FIG. 13.

Figure 7:
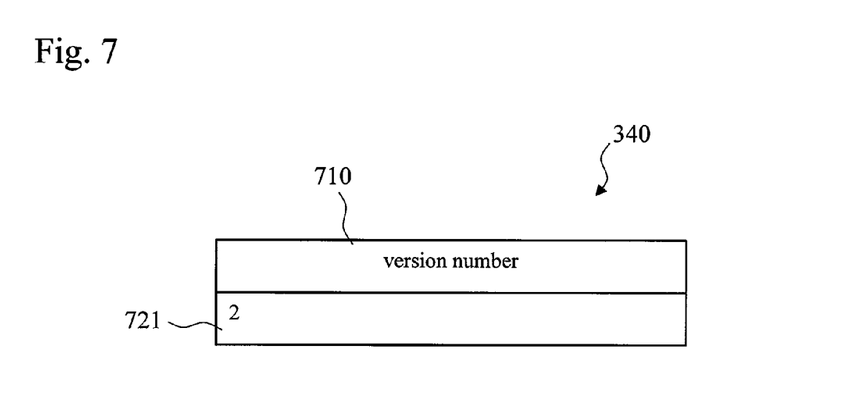
FIG. 7 is a diagram showing a configuration example of a version number.

The version number storage area 340 is an area for managing the version number of the firmware image 165, and a detailed configuration is shown in FIG. 7. It is noted that, besides version numbers, the version number storage area 340 may also manage metadata of the device 160.

The working data area 350 is an area in the RAM 162 that is used to store data that the update optimization program 320 uses and to generate from the received update file 140 optimized update data that is necessary for a firmware update. A generated example of optimized update data is described using FIG. 8.

Of the above, the update reception program 310, the update optimization program 320, the update applying program 330, and the version number storage area 340 are written in the flash memory 164. It is noted that the working data area 350 may exist in the RAM 162, or it may be written in the flash memory 164.

<Configuration of Update Data>

Figure 4:
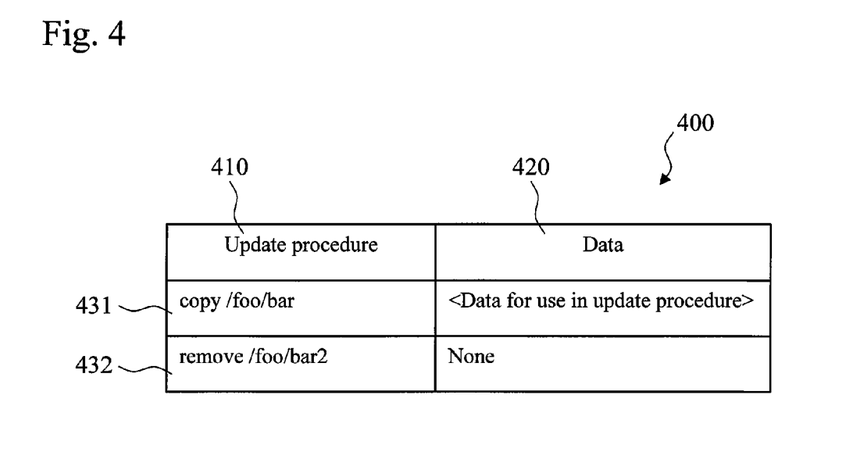
FIG. 4 is a diagram showing a configuration example of update data.

FIG. 4 is a diagram showing a configuration example of update file 400. The update file 400 corresponds to the data structure used for the difference file group 136 and the update file 140, and comprises update procedures 410 and configuration data 420. The update data 400 becomes an element of the difference file group and the update file.

The update procedures 410 are information that states how the data 420 is to be used to perform an update. For example, row 431 signifies that a file identified as /foo/bar within the firmware image 165 is to be overwritten with the data stored in the data 420 of row 431. In addition, row 432 signifies that the file /foo/bar2 within the firmware image 165 is to be deleted.

<Configuration of Difference File Group>

FIG. 5 is a diagram showing a configuration example of the difference file group 136. The difference file group 136 comprises difference version numbers 510 and update data 520.

The difference version numbers 510 are of the format <old version>→<new version>, and update data for upgrading from the <old version> to the <new version> is written in the update data 520.

As a format of the update data, for example, the update procedures 410 that are necessary for upgrading from firmware of version 1 to firmware of version 2 and the necessary configuration data 420 (see FIG. 4) are written in row 531.

<Configuration of Update File>

FIG. 6 is a diagram showing a configuration example of the update file 140. Pairs of a difference version number 610 and update data 620 are stored in the update file 140 as in the difference file group 136. It is noted that the update file 140 is a file that is to be actually distributed. For example, whereas the difference file group 136 comprises all difference files (difference version numbers+update data), the update file 140 comprises the difference files that remain after difference files of or older than a given version are removed from the difference file group 136.

<Version Number>

FIG. 7 is a diagram showing a configuration of the version number 340. The version number of the firmware image 165 of the device 160 is recorded in a version number 710. For example, since this is "2" for 721, this signifies that the version number of the firmware image 165 of the device 160 is 2.

<Configuration Example of Working Data Area>

Figure 8:
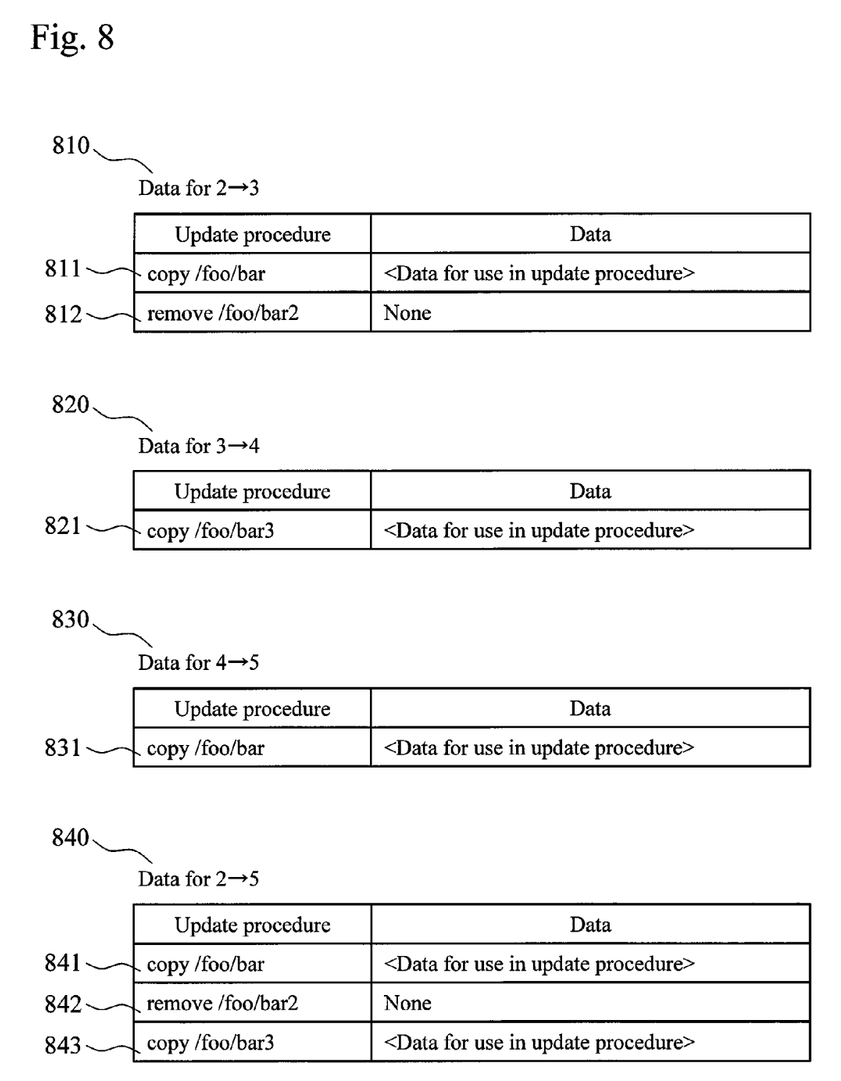
FIG. 8 is a diagram showing a configuration example of a working data area.

FIG. 8 is a diagram showing a configuration example of data stored in the working data area 350. Pairs of an update procedure and data are stored. The difference data stored in the working data area 350 are difference data having a greater version than the version number 710 (for example, 810, 820 and 830) as well as difference data optimized based thereon (for example, 840)

<Process Content of Update Creation Function>

FIG. 9 is a flowchart illustrating the process content of the update creation function 220. It is noted that while the process of each step is executed by the CPU 131, an update creation processing part comprises the update creation function 220 and the CPU 131 working in coordination. The process below is described assuming that the update creation processing part performs operations.

First, the update creation processing part receives the firmware image 120 (step 910).

Then, the update creation processing part generates the difference between the received firmware image 120 and the old-version firmware image 135, and creates update data of the format in FIG. 4 (step 920). For example, if the /foo/bar file is present in the firmware image 120 and the /foo/bar file is absent in the old-version firmware image 135, such update data as that of row 431 is generated. Then, the data of /foo/bar included in the firmware image 120 is stored in the data 420. In addition, if /foo/bar2 is present in the old-version firmware image 135 but is absent in the firmware image 120, such update data as that of row 432 is generated.

Lastly, the update creation processing part adds to the difference file group 136 the update data created in step 920 (step 930). For example, if the version of the received firmware image is 5 and the version of the old-version firmware image is 4, such data as that of row 534 is added (see FIG. 5).

<Process Content of Update Distribution Function>

FIG. 10 is a flowchart illustrating the process content of the update distribution function 230. It is noted that while the process of each step is executed by the CPU 131, an update distribution processing part comprises the update distribution function 230 and the CPU 131 working in coordination. The process below is described assuming that the update distribution processing part performs operations.

The update distribution processing part creates the update file 140 based on the difference file group 136 (step 1010). For example, if the version of the latest firmware is N, update data corresponding to difference version numbers 1→2, 2→3, 3→4, . . . , N−1→N are extracted. If the latest firmware version is 5, the update file 140 would be of such a configuration as that shown in FIG. 6. It is noted that the update file 140 may be of the same content as the difference file group 136 in some cases, and it may comprise just a selection of difference files from the difference file group 136 in some cases.

Then, the update distribution processing part distributes the update file 140 created in step 1010 to the device 160 via the broadcast network 150 (step 1020).

<Content of Update Reception Process>

FIG. 11 is a flowchart illustrating the process content of the update reception program 310. It is noted that while the process of each step is executed by the CPU 161, an update reception processing part comprises the update reception program 310 and the CPU 161 working in coordination. The process below is described assuming that the update reception processing part performs operations.

First, the update reception processing part starts reception of the update file 140 that has been transmitted via the broadcast network 150 (step 1110). Then, the processes of steps 1130 and 1140 are executed with respect to each row of the update file 140 (step 1120).

Specifically, the update reception processing part compares the version number of the new version in the difference version number 610 with the version number 340 on the device's end (step 1130). This is to reduce the amount of resources consumed at the device 160 by not saving in the working data area 350 data that is not used in later update processes. If the number of the new version in the difference version number 610 is greater than the version number 340, the process proceeds to 1140. For example, if the version number 340 on the side of the device 160 is 2, in the case of the update file in FIG. 6, the process of step 1140 would be executed with respect to rows 632, 633 and 634.

Then, the update reception processing part saves in, for example, the working data area 350 pairs of the necessary difference version numbers 610 and update data 620. Although it is described above that the necessary data is saved in the working data area 350, it is not limited as such and may instead be the RAM 162 or an empty area in the flash memory 164.

<Content of Update Optimization Process>

FIG. 12 is a flowchart illustrating the process content of the update optimization program 320. It is noted that while the process of each step is executed by the CPU 161, an update optimization processing part comprises the update optimization program 320 and the CPU 161 working in coordination. The process below is described assuming that the update optimization processing part performs operations.

First, before describing the process in each step, the purpose of this update optimization process is described. If the version of the latest firmware is 5, the distributed update file 140 would separately comprise: the procedure for updating from version 1→2 of the firmware and configuration data; the procedure for 2→3 and configuration data; the procedure for 3→4 and configuration data; and the procedure for 4→5 and configuration data. Further, if the version of the firmware of the device 160 is 2, it is necessary to sequentially upgrade as in 2→3, 3→4 and 4→5. In the process of sequentially upgrading, when there are upgrades for the same file, the file writing time for upgrading proves a waste. For example, if copies of the /foo/bar file were to occur in upgrading from 2→3 and 4→5, the /foo/bar file would be written in flash ROM twice, which is a waste. As such, in order to prevent such wastes, the update optimization program 320 generates an update procedure and configuration data for directly updating directly from version 2 to version 5, and optimizes the file in such a manner that only the last process of copying, deleting, etc., would have to be executed. A description is provided below using an example in which the update file in FIG. 6 is received.

The update optimization processing part creates update data for difference version number S→N as an empty table, where S=current version number 340 and N=latest firmware version number (step 1210). In the present example, S=2 and N=5. N can be found by way of the newest version number among the difference version numbers 610 in the update file in FIG. 6.

Next, the update optimization processing part performs the processes in step 1230 to step 1270 with respect to S≤i≤N−1 (step 1220). In the present example, 2≤i≤4. Specifically, the update optimization processing part extracts from the data received by the update reception program (update reception processing part) 310 (in the present example, rows 632 to 634 in FIG. 6) and into the working area 350 the update data 620 for difference version number i→i+1 (step 1230). If i=2, the update data of row 632 would be extracted. Examples of the update data extracted in this step are shown with 810, 820, 830 and 840 in FIG. 8. They are update data corresponding to i=2, 3, 4, respectively.

Next, the update optimization processing part performs the processes in step 1250 to step 1270 with respect to each row of the extracted update data (step 1240). Specifically, the update optimization processing part checks whether or not the extracted update procedure matches the update procedure of the update data for S→N (step 1250). If it does match (Yes in step 1250), the update optimization processing part overwrites the data of the update data for S→N with the data of difference version number i→i+1 (step 1260). On the other hand, if it does not match (No in step 1250), the update optimization processing part adds the pair of extracted update procedure and data to the update data for S→N (step 1270).

In order to supplement the description above regarding the process content in steps 1240 to 1270, a description is provided using a specific example.

When i=2 in a repeated process, 840 is empty. Thus, step 1250 results in a No (no match), and the contents of rows 811 and 812 are added to rows 841 and 842, respectively, in step 1270.

When i=3 in the repeated process, rows 841 and 842 are already present in 840. However, since the update procedure copy/foo/bar3 is not present, step 1250 results in a No (no match), and the content of row 821 is added to row 843 in step 1270.

When i=4 in the repeated process, rows 841, 842 and 843 are already present in 840. Since the update procedure copy/foo/bar is present in both 830 and 840, step 1250 results in a Yes (match). Thus, in step 1260, the data of row 843 is overwritten with the data of 830.

By executing the processes above, it becomes possible to construct in 840 the necessary update procedure and data for upgrading the firmware image directly from version 2 to version 5. Whereas writing in the /foo/bar file occurs twice at rows 811 and 831 when sequential upgrading is performed as in version 2→3, 3→4, 4→5, in the upgrade from version 2→5 generated in 840, writing in the /foo/bar file only occurs once at row 841. Thus, it becomes possible to shorten the duration of the firmware update process.

<Content of Update Application Process>

FIG. 13 is a flowchart illustrating the process content of the update applying program 330. It is noted that while the process of each step is executed by the CPU 161, an update application processing part comprises the update applying program 330 and the CPU 161 working in coordination. The process below is described assuming that the update application processing part performs operations.

When a firmware update is instructed, the update application processing part calls the update optimization program and causes it to execute an optimization process (each step in FIG. 12) for the received update file 140 to obtain optimized update data (step 1310).

Then, in accordance with the update procedure included in the optimized update data (840 in the example used in the description of FIG. 12) generated through the update optimization process, the update application processing part updates the firmware image 165 in the flash memory 164 (step 1320).

<Conclusion>

In the present embodiment, the update creation/distribution server stores a plurality of difference files which are, with respect to firmware images of a plurality of versions, differences between firmware images of mutually adjacent versions. Further, the server generates a plurality of differences files, which are at least a portion of all stored difference files, as an update file (depending on the creation date of the firmware, there may be cases where, when the difference files are 1→2, 2→3 ..., j−1→j, the update file is 5→6 ..., j−1→j), and distributes this generated update file (comprising the plurality of difference files) to information devices via a network that enables point-to-multipoint, such as a broadcast network, etc. Thus, it becomes no longer necessary to create and distribute all update data from all versions to the latest version, thereby making it possible to reduce the size of the data to be distributed. In particular, since broadcast networks have high per-bit costs, it becomes possible to reduce distribution costs.

Further, upon acquiring the firmware image of the latest version, the update creation/distribution server generates a latest difference file (j−1→j), which is the difference between the firmware image of the latest version (j) and the firmware image of the most recent old version (j−1), and adds the latest difference file to the difference file group storage part. Thus, there is no need to compute the difference between all old versions and the latest version each time firmware of the latest version is supplied, and it is possible to reduce the burden on the server's end.

To describe more specifically, with respect to distribution size, in simple difference distribution, N−1 differences comprising the 1→N difference, the 2→N difference, the 3→N difference ..., and the N−1→N difference are distributed. With this method, since the version difference for each difference is significant, the data sizes of the differences become significant. On the other hand, in the present invention, N−1 differences comprising the 1→2 difference, the 2→3 difference ... and the N−1→N difference are distributed. Since the version difference for each difference is 1, the data sizes of the differences become smaller as compared to simple difference distribution.

On the other hand, the firmware embedded device (information device) receives the update file transmitted via a broadcast network, generates optimized update data most suited for updating the firmware image of the current version based on the update file, and updates the firmware image by applying that to the firmware image of the current version. More specifically, upon receiving the update file, the device deletes from the received update file the difference files of versions numbers up to that of the firmware image of the current version, and takes the remaining difference files to be an applicable file. Further, the device generates optimized update data (update data for directly updating from the firmware image of the current version to the firmware image of the latest version) by removing redundant update procedures from the plurality of difference files included in the applicable file and keeping only the latest update procedure and configuration data.

To describe more specifically, with respect to the requisite storage area of the firmware embedded device, since, of the N−1 distributed j−1→j differences (where $2 \leq j \leq N$), only the differences for which i<j are kept in the storage area, the requisite storage area is smaller than it would be if updates were to be simply received and saved.

In addition, with respect also to the processing time for writing the update content for the device in flash memory, if the (j−1)→j differences (where $i < j \leq N$) saved in the storage area were to be written in flash memory as is, redundant writing would take place in cases where the same file is updated in each difference. For example, if the /foo/bar file were to be updated in all of the differences, the /foo/bar file would be written N−i times. On the other hand, in the present method, the i→N difference is generated dynamically before writing in flash memory. Thus, writing in the /foo/bar file is performed once, thereby achieving shortened writing time.

It is noted that the present invention may also be realized by way of a program code of software that realizes the functions of the embodiment. In this case, a storage medium on which the program code is recorded is supplied to a system or an apparatus, and a computer (or CPU or MPU) of the system or apparatus reads the program code stored on the storage medium. In this case, the program code itself that has been read from the storage medium would realize the functions of the embodiment discussed above, and the program code itself, as well as the storage medium storing it, would constitute the present invention. As such a storage medium for supplying program codes, by way of example, flexible disks, CD-ROMs, DVD-ROMs, hard disks, optical disks, magneto-optical disks, CD-Rs, magnetic tapes, non-volatile memory cards, ROM, etc., are used.

In addition, an OS (operating system), etc., running on a computer may perform part or all of the actual processes based on instructions of the program code, and the functions of the embodiment discussed above may be realized by those processes. Further, after the program code read from the storage medium has been written in the memory on the computer, a CPU, etc., of the computer may perform part or all of the actual processes based on the instructions of that program code, and the functions of the embodiment discussed above may be realized by those processes.

In addition, a program code of software that realizes the functions of the embodiment may be distributed via a network to have it stored on a storage means, such as a hard disk, memory, etc., of a system or apparatus, or on a storage medium, such as a CD-RW, CD-R, etc. The program code stored on the storage means or the storage medium may be read and executed by a computer (or a CPU or MPU) of the system or the apparatus at the time of use.

REFERENCES SIGNS LIST

120 ... Firmware image
130 ... Update creation/distribution server
131 ... CPU
132 ... RAM
133 ... Network interface
134 ... HDD
135 ... Old-version firmware image storage part
136 ... Difference file group storage part
140 ... Update file
150 ... Broadcast network
160 ... Information device
161 ... CPU
162 ... RAM
163 ... Radio wave turner
164 ... Flash memory
165 ... Firmware image (currently in use)
400 ... Update data

The invention claimed is:

1. An information device in which firmware is embedded, the information device comprising:
a processor; and
storage media storing a current version of the firmware and encoded with instructions that, when executed on the processor, instruct the processor to:
receive an update file for updating the firmware, the update file being transmitted via a network, where
the update file comprises a plurality of difference files that are, with respect to firmware images of a plurality of versions UP to a latest version, differences between the firmware images of mutually adjacent versions, and
the difference files each comprise a difference version number and update data, the difference version number indicating that it is a difference between firmware images of version j (where j=1 ..., n−1; and n is an integer satisfying n>j) and version j+1, and the update data comprising an update procedure and configuration data to be used in the update procedure, the update procedure indicating what sort of a process is to be executed with respect to which file of the firmware;
delete from the received update file the difference files of version numbers up to the version number of the firmware image of the current version, and taking the remaining difference files to be an applicable file;
generate optimized update data for directly updating the firmware image of the current version to the firmware image of the latest version by removing redundant update procedures from the difference files included in the applicable file, leaving only the latest update procedure and configuration data as the optimized update data; and
update the firmware image by applying the optimized update data to the firmware image of the current version.

2. A non-transitory computer readable storage medium encoded with instructions that, when executed by a computer, cause the computer to perform a method to update a current version of firmware comprising:
receiving an update file for updating the firmware, the update file being transmitted via a network, where
the update file comprises a plurality of difference files that are, with respect to firmware images of a plurality of versions uP to a latest version, differences between the firmware images of mutually adjacent versions, and
the difference files each comprise a difference version number and update data, the difference version number indicating that it is a difference between firmware images of version j (where j=1 ..., n−1; and n is an integer satisfying n>j) and version j+1, and the update data comprising an update procedure and configuration data to be used in the update procedure, the update procedure indicating what sort of a process is to be executed with respect to which file of the firmware;
deleting from the received update file the difference files of version numbers up to the version number of the firmware image of the current version, and taking the remaining difference files to be an applicable file;
generating optimized update data for directly updating the firmware image of the current version to the firmware image of the latest version by removing redundant update procedures from the difference files included in the applicable file, leaving only the latest update procedure and configuration data as the optimized update data; and
updating the firmware image by applying the optimized update data to the firmware image of the current version.

3. A method to update a current version of firmware comprising:
receiving an update file for updating the firmware, the update file being transmitted via a network, where
the update file comprises a plurality of difference files that are, with respect to firmware images of a plurality of versions up to a latest version, differences between the firmware images of mutually adjacent versions, and
the difference files each comprise a difference version number and update data, the difference version number indicating that it is a difference between firmware images of version j (where j=1 ..., n−1; and n is an integer satisfying n>j) and version j+1, and the update data comprising an update procedure and configuration data to be used in the update procedure, the update procedure indicating what sort of a process is to be executed with respect to which file of the firmware;
deleting from the received update file the difference files of version numbers up to the version number of the firmware image of the current version, and taking the remaining difference files to be an applicable file;
generating optimized update data for directly updating the firmware image of the current version to the firmware image of the latest version by removing redundant update procedures from the difference files included in the applicable file, leaving only the latest update procedure and configuration data as the optimized update data; and
updating the firmware image by applying the optimized update data to the firmware image of the current version.

* * * * *